June 20, 1961

P. H. DUSSUMIER DE FONBRUNE ET AL 2,988,928

MICROMANIPULATOR CONTROLLER

Filed May 12, 1958

United States Patent Office 2,988,928
Patented June 20, 1961

2,988,928
MICROMANIPULATOR CONTROLLER
Pierre Henry Dussumier de Fonbrune, 10 Rue des Reservoirs, Versailles, France, and Paul André Beaudouin, 1 Rue Rataud, Paris, France
Filed May 12, 1958, Ser. No. 734,725
Claims priority, application France May 18, 1957
8 Claims. (Cl. 74—471)

This invention relates to micromanipulator systems, i.e. systems serving to impart extremely minute, accurately controlled displacements to micro-tools and micro-instruments of the type used for example in surgically operating on, and dissecting, bacteria, microorganisms single cells, and other kinds of biological material as well as performing various physical and chemical experiments on extremely small amounts of matter.

In such systems the over-all displacements to be imparted are frequently on the order of one micron, while at the same time complete three-dimensional freedom of linear and angular displacement throughout the operating field is necessary. Thus the precision and flexibility requirements placed on micromanipulator systems are unparallel in other mechanical fields.

Broadly, a micromanipulator system comprises a controller unit including one or more manual controls, and a receiver unit containing the controlled element (such as a micro-tool and/or micro work-carrier) which is arranged for observation under strong optical magnification by the operator as he manipulates the controls. Suitable movement transmitting means, generally utilizing a pneumatic or hydraulic fluid pressure medium, or alternatively electric signal transmitting means, serve to transmit the movements from the controls to the controlled element.

It is a general object of this invention to provide an improved controller unit for a micromanipulator system. Other objects are to improve the accuracy, enhance operating ease and reliability, reduce the number and complexity of component parts, as well as the overall dimensions, of a micromanipulator controller. More specific objects are to provide an improved universally mounted controller stick for a micromanipulator controller unit; to provide such a controller stick with improved spring means for pressing the spherical swivel of the stick into its socket under a constant, adjustable bias; to provide such a controller stick with means for selectively modifying the ratio from stick displacement to resultant output displacement of the controller element; to provide such a controller stick with improved means whereby stick displacement about the geometrical center of its universal mounting will effect displacement of the controlled element along two coordinate directions, whereas rotation of the stick about its longitudinal axis will effect displacement or the controlled element along a third coordinate. A further object is to provide an improved geometrical lay-out for the universally mounted controller and the actuator and other parts connected thereto, such that forces and torques applied to the stick are more satisfactorily distributed and balanced to improve the kinematics of the unit and achieve optimum operation.

The above and further objects of the invention, as well as the novel features thereof, will appear as the description proceeds. It is to be understood that the description and the drawings referred to therein are exemplary only, but not restrictive. Thus, while the embodiment specifically described and shown operates with fluid pressure as the transmitting medium, various ones of the novel and improved features taught herein are equally applicable to micromanipulator systems wherein electrical movement transmitting means are used, as will be readily apparent to those skilled in this art.

Figure 1:
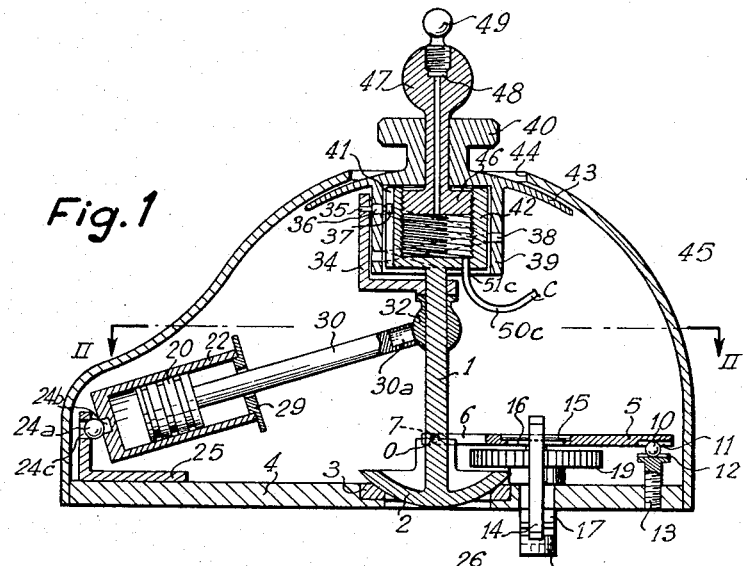
FIG. 1 is a view of the device in sectional elevation, on line I—I of FIG. 2.
Figure 2:
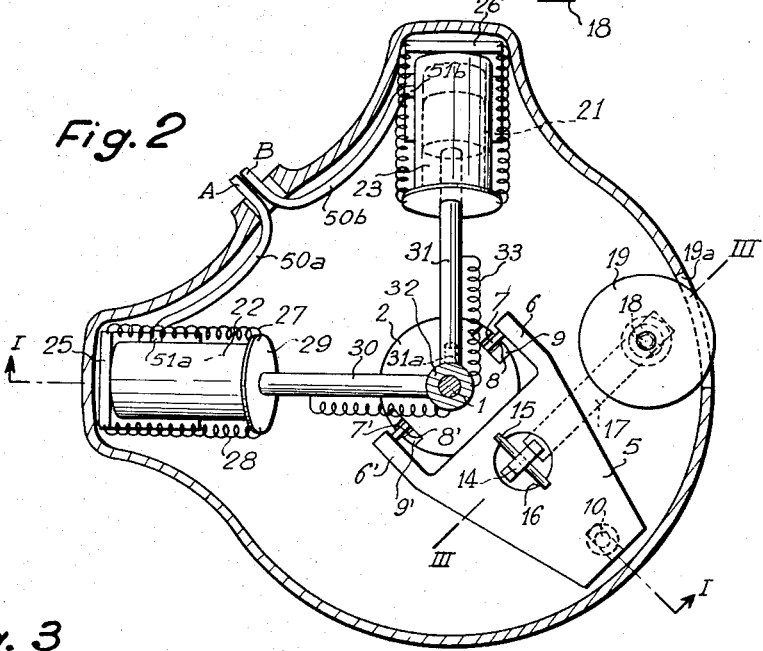
FIG. 2 is an overhead sectional view on line II—II of FIG. 1.
Figure 3:
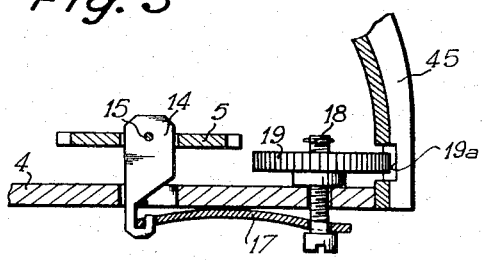
FIG. 3 shows a detail in section on line III—III of FIG. 2.

As shown micromanipulator controller mechanism according to the invention comprises a controller stick or lever 1 having a part-spherical swivel member 2 integrally connected with its lower end which is swivelled in a socket seating member 3 which is desirably made of the material known as Teflon, and secured in a base 4. Means are provided for preventing rotation of the swivel member 2 and lever 1 about the longitudinal axis of the lever 1 and for adjusting the degree of friction between the swivel member and its cooperating socket surface. These means comprise a plate 5 having one end formed with a pair of spaced parallel fork tines or arms 6 and 6' (see FIG. 2) having aligned pivot pins 7, 7' projecting therefrom towards each other, which pins engage V-shaped notches 8 and 8' respectively formed in the upper end faces of a pair of upwardly projecting portions 9 and 9' formed at diametrically opposite sides of the spherical swivel member 2, so that the common axis of the pivots 7, 7' extends through the geometrical center 0 of the part-spherical surface. The outer end of the plate 5 rests freely upon a ball 10 which partly engages at its top and bottom a pair of indentations 11, 12, respectively formed in the under face of the plate 5, axially of said plate, and in the upper end face of the head of a screw 13 adjustably screwed into a threaded hole in baseplate 4. Formed generally centrally of the plate 5 is a circular aperture 16 across which a pin 15 is secured. Pivoted on the pin 15, as more clearly shown in FIG. 3, is the upper end of a member 14 the lower end of which is formed as a hook, and an arcuate leaf spring 17 has one end engaged by the hook and its opposite end is apertured and engaged by the head of a screw 18 extending freely through a hole in the baseplate and having an internally threaded adjusting knob 19 screwed on the top of the screw above the baseplate. The leaf spring 17 has an intermediate portion engaging the under face of the baseplate 4 as shown. Thus, adjustment of knob 19 will serve to vary the downward pull exerted on hook member 14 and hence the degree of frictional engagement between the mating surfaces of the swivel and socket connection. It will be noted that the pulling force developed by the spring 17 to apply the spherical swivel into its socket always extends through the point 15 lying on the line connecting the geometrical center 0 of the spherical swivel with the ball 10. Further, it is seen that the spherical swivel and lever are prevented from rotation about the longitudinal axis of the lever during pivotal movements of the lever 1 about the center 0 of the swivel.

A spherical sliding swivel member 32 of relatively small size is slidably mounted on controller lever 1 and is engaged by the socketed, lubricant-filled extremities 30a and 31a of two respective piston rods 40 and 31 which extend in two mutually perpendicular planes from the actuator rod 1, and carry pistons 20 and 21 at their opposite ends reciprocable in cylinders 22 and 23. The outer ends of the cylinders are swivelled to the upstanding flanges of brackets 25 the horizontal flanges of which are secured to the baseplate 4. Each swivel connections comprises, as shown, a ball such as 24a partly seated in a recess 24b formed in the outer end of the cylinder and a recess 24c in the upstanding bracket flange. The centers of the balls 24a are positioned in the same horizontal plane as that containing the geometrical center 0 of the lever swivel member 2. Tension springs 27, 28 having their opposite ends attached to the bracket 25 and a flange 29 of the cylinder resiliently retains each cylinder in engagement with its swivel ball 24a, while preventing rotation of the cylinder-and-piston assembly about said ball.

Further, tension springs 33 having opposite ends fixed to the piston rods 30, 31 and to the swivel member 32 serve to retain the ends of the piston rods in engagement with the swivel member 32.

With the arrangement so far described, it will be understood that assuming a definite position of the slidable swivel member 32 along the controller stick or lever 1, then displacement of said lever about the center 0 of its swivel in a vertical plane containing the piston rod 30, will act to reciprocate only the related piston 20 in its cylinder 22, while displacement of the lever 1 in a vertical plane containing piston rod 31 will reciprocate only the piston 21 in its cylinder. In the first instance, the cylinder 23 together with the piston 21 therein and piston rod 22 swing bodily about the related swivel ball 24 since the right-angled triangle generally defined by the center of ball 24a, the center of sliding swivel 32 and center 0 of swivel 2 does not change shape during such movement; in the second instance a similar situation is present in relation to the other cylinder and piston assembly.

The cylinders 21 and 22 are connected through flexible lines 50a and 50b with suitable fluid power systems designated A and B, not illustrated herein. Thus, displacement of operating lever 1 about its swivel center 0 in any plane, will act simultaneously on both pistons 20 and 21 to convert the respective components of the displacement of said lever as resolved in two mutually normal planes, into corresponding fluid pressure variations in the respective fluid systems A and B.

Sliding adjustment of the sliding swivel 32 along the length of the lever 1 serves to adjust the magnitude of such pressure variations through the system now to be described. Secured to the top of the sliding swivel member 32 is a bracket 34 having a pivot pin 35 projecting from its upstanding flange towards the controller-stick 1. Pivoted on the pin 35 are two small rollers 36 and 37. Roller 36 engages a helical cam surface 38 formed in the cylindrical wall of a sleeve 39 depending from an annular adjusting member 40 coaxial with and rotatably surrounding the upper portion of the stick 1. Roller 37 engages a longitudinal groove 41 formed in the outer side wall of a hollow cylindrical portion 42 forming part of the controller stick 1 as later described in detail, and slidingly engaged in the sleeve 39.

Rotation of the ring or knob 40 causes rotation of the sleeve 39 about the fixed cylinder part 42, causing the rollers 36 and 37 to move simultaneously along the helical cam surface 38 and groove 41 respectively, so that the bracket 34 is displaced in a vertical direction and imparts a vertical sliding movement to the slider swivel 32 along the stick 1 while restraining said swivel from rotation about said stick. This movement of the slider swivel 32 positions both pistons 20 and 21 within their cylinders and serves to alter the length of displacement of said pistons produced by a given displacement of the rod 1. The piston displacement is reduced to zero when the slider swivel 32 is brought to its lowermost position in which it is concentric with the center 0 of the main swivel member 2.

Extending integrally from the adjusting ring 40 and spaced somewhat below said ring is a part-spherical flange 43 which serves to provide an internal closure for an aperture 44 formed in the top of a casing 45 secured on the baseplate 4 and entirely surrounding the mechanism described. The aperture 44 is wide enough to allow for the full angular range of displacements impartable to the lever or stick 1 about the center point 0. The casing 45 is generally dome-like in its upper portion, so as to provide the operator with a continuous support on which to rest his hand while operating the spherical knob 47 formed at the top of the lever or stick 1, between his finger and thumb. A slot 19a (see FIG. 3) is formed in the side of the casing 45 near its base and the pressure adjusting knob 19 previously described partly projects through this slot for convenient operation from outside the casing. The part-spherical flange 43 is formed with an index which may cooperate with a suitable scale provided on the casing 45 to provide an indication of the vertical position of the slider swivel 32.

Displacement of the controller stick 1 about the center 0 acts, by way of the pistons 20 and 21 and the fluid transmission lines A and B, to produce corresponding displacement of a controlled element in a receiver unit, not shown, along two coordinate directions. Displacement of the controlled element along the third coordinate direction is also provided for according to the invention, as will now be described.

The upper section of controller stick 1 including the actuating knob 47 is threadedly connected with the main or lower section of the stick 1 by a screw threaded enlargement 46 provided at the lower end of said upper section, cooperating with the threaded internal periphery of the afore-mentioned cylindrical portion 42. The interior of this portion thus defines a fluid chamber the lower end of which is connected by flexible line 50c with a third fluid circuit, not shown, indicated as C. This cylinder chamber is filled with compressed fluid, so that by rotating the knob 47 as by twirling it between finger and thumb the pressure of the fluid in the circuit C is controlled to control the position of the receiver element along the third coordinate. Further, the upper section of rod 1 is axially bored to connect the cylinder chamber in member 42 with an auxiliary compression chamber 48 formed in the knob 47. This auxiliary chamber threadedly receives a micro-adjusting knob 49 therein having a short screw pitch so that complementary rotation of the knob 49 permits fine adjustment of the pressure in the third fluid circuit C. All threaded connections described are machined to within close tolerances to provide a fluid-tight seal, and this is improved by the provision of a film of lubricant between the threaded elements. The pressure fluid used is desirably gaseous, e.g. air, though hydraulic fluid may also be used, as well as combined pneumatic-hydraulic fluid systems.

In a modification of the invention, the fluid pressure systems can be replaced with electric remote transmission systems. In such case the pistons 20, 21 and 46 and related cylinders would be replaced by electric pick-off means of any suitable conventional character, inductive, resistive, or capacitive. Thus, in one convenient embodiment, the pistons 20, 21, and 46 may be replaced by magnetic cores displaceable axially of cooperating inductive generators or variable transformers of the type having primary windings energized from an A.C. source so as to induce in the secondaries output signals corresponding to the position of the core.

Various other modifications may be conceived by those skilled in the art. The number and geometrical arrangement of the pistons, or equivalent pick-off elements, may differ from what is shown.

What we claim is:

1. A micromanipulator comprising, in combination, means defining a spherical seat, a controller stick having a spherical end seated in said seat for universal movement therein, said spherical end having a substantially greater cross-sectional area than the cross-sectional area of said controller stick and the periphery thereof extending radially outwardly of said stick, two mutually converging elongated members of fixed length operably connected to said controller stick at right angles to each other, said two elongated members having respective convergent ends connected to said controller stick at points disposed radially inwardly of the periphery of said spherical end, means positionable variably axially on the stick for variably determining longitudinal displacement of said two members when said two members are displaced by movement of said stick relative to a given position corresponding to a neutral position in operation of the stick, for each of the said two elongated members a signal generator, the signal generators having means pivotally mounted for universal movement about respective pivotal points and cooperative with said two members respectively at the divergent ends thereof for allowing universal movement of said stick and longitudinal displacement of said two members in dependence upon displacement of said stick relative to said neutral position, said signal generators including respective signal generating means for each elongated member each having means operably coupled to a respective elongated member for generating a separate positioning signal proportional to the longitudinal displacement of the corresponding elongated member and corresponding to two positioning signals operative in two separate coordinates.

2. A micromanipulator comprising, in combination, means defining a spherical seat, a controller stick having a spherical end seated in said seat for universal movement therein, said spherical end having a substantially greater cross-sectional area than the cross-sectional area of said controller stick and the periphery thereof extending radially outwardly of said stick, means for precluding rotation of said stick, two mutually converging elongated members of fixed length operably connected to said controller stick at right angles to each other, said two elongated members having respective convergent ends connected to said controller stick at points disposed radially inwardly of the periphery of said spherical end, means pivotally connecting the convergent ends of the two members to said stick for variably determining longitudinal displacement of said two members when said two members are displaced by movement of said stick relative to a given position corresponding to a neutral position in operation of the stick, means coaxial with said controller stick having a camming surface including rotatable means operable at will for accurately positioning in response to rotation thereof and under control of said camming surface said last-mentioned means axially on said stick in any axial position between two limits defined axially on said stick; for each of said two elongated members a signal generator, the signal generators having means pivotally mounted for universal movement about respective pivotal points and cooperative with said two members respectively at the divergent ends thereof allowing universal movement of said stick and longitudinal displacement of said two members in dependence upon displacement of said stick relative to said neutral position, said signal generators including respective signal generating means for each elongated member each having means operably coupled to a respective elongated member for generating a separate positioning signal proportional to the longitudinal displacement of the corresponding elongated member with respect to said neutral position, and said signals corresponding to two positioning signals operative in two separate coordinates.

3. A micromanipulator comprising, in combination, means defining a spherical seat, a controller stick having a spherical end seated in said seat for universal movement therein, said spherical end having a substantially greater cross-sectional area than the cross-sectional area of said controller stick and the periphery thereof extending radially outwardly of said stick, two mutually converging elongated members of fixed length operably connected to said stick at right angles to each other, said two elongated members having respective convergent ends connected to said controller stick at points disposed radially inwardly of the periphery of said spherical end, means positionable variably axially on the stick for variably determining longitudinal displacement of said two members when said two members are displaced by movement of said stick relative to a given position corresponding to a neutral position in operation of the stick, means connected to said stick to preclude rotation thereof and including means for applying axially directed variable pressure for holding said spherical end seated in said seat, for each of the said two elongated members a signal generator, the signal generators having means pivotally mounted for universal movement about respective pivotal points and cooperative with said two members respectively at the divergent ends thereof for allowing universal movement of said stick and longitudinal displacement of said two members in dependence upon displacement of said stick relative to said neutral position, said signal generators including respective signal generating means for each elongated member each having means operably coupled to a respective elongated member for generating a separate positioning signal proportional to the longitudinal displacement of the corresponding elongated member and corresponding to two positioning signals operative in two separate coordinates, and means cooperative with said stick for generating a third positioning signal representative of a signal operative in a third coordinate.

4. A micromanipulator according to claim 3, in which said stick has an enlarged end formed opposite to said spherical end defining a fluid-containing chamber, said third signal generating means comprising, means displaceable at will axially in said chamber for varying the size of said chamber to displace fluid out of said chamber and fixable in set positions in said chamber, and means providing communication from said chamber externally of the micromanipulator.

5. A micromanipulator according to claim 4, further including fine adjustment means for displacing liquid out of said chamber in minute quantities less than the liquid displaced out of said chamber upon any axial movement of said axially displaceable means on said stick.

6. A micromanipulator comprising, in combination, means defining a spherical seat, a controller stick having a spherical end seated in said seat for universal movement therein, said spherical end having a substantially greater cross-sectional area than the cross-sectional area of said controller stick and the periphery thereof extending radially outwardly of said stick, two mutually converging elongated members of fixed length operably connected to said controller stick at right angles to each other, said two elongated members having respective convergent ends connected to said controller stick at points disposed radially inwardly of the periphery of said spherical end, means positionable variably axially on the stick for variably determining longitudinal displacement of said two members when said two members are displaced by movement of said stick relative to a given position corresponding to a neutral position in operation of the stick, for each of the said two elongated members a signal generator, the signal generators having means pivotally mounted for universal movement about respective pivotal points and cooperative with said two members respectively at the divergent ends thereof for allowing universal movement of said stick and longitudinal displacement of said two members in dependence upon displacement of said stick relative to said neutral position, said signal generators including respective signal generating means for each elongated member each having means operably coupled to a respective elongated member for generating a separate positioning signal proportional to the longitudinal displacement of the corresponding elongated member and corresponding to two positioning signals operative in two separate coordinates, and means to variably apply axially directed pressure to said stick to variably control friction between said spherical end of the stick and said spherical seat.

7. A micromanipulator according to claim 6, further including means for generating a third positioning signal corresponding to a third coordinate at right angles to said two coordinates.

8. A micromanipulator comprising, in combination, means defining a spherical seat, a controller stick having a spherical end seated in said seat for universal movement therein, said spherical end having a substantially greater cross-sectional area than the cross-sectional area of said controller stick and the periphery thereof extending radially outwardly of said stick, two mutually converging elongated members of fixed length operably connected to said controller stick at right angles to each other, said two elongated members having respective convergent ends connected to said controller stick at points disposed radially inwardly of the periphery of said spherical end, means pivotally connecting the convergent ends of the two members to said stick including means positionable variably axially on the stick for variably determining longitudinal displacement of said two members when said two members are displaced by movement of said stick relative to a given position corresponding to a neutral position in operation of the stick, means for accurately positioning said last-mentioned means axially on said stick in any axial position between two limits defined axially on said stick, for each of said two elongated members a signal generator, the signal generators having respective fluid-filled cylinders pivotally mounted for universal movement about respective pivotal points and cooperative with said two members respectively at the divergent ends thereof allowing universal movement of said stick and longitudinal displacement of said two members in the respective cylinders in dependence upon displacement of said stick relative to said neutral position, said signal generators each having a piston operably coupled to a respective elongated member and reciprocable in a respective cylinder for generating a separate, respective positioning signal proportional to the longitudinal displacement of the corresponding elongated member, and said signals corresponding to two positioning signals operative in two separate coordinates.

References Cited in the file of this patent

UNITED STATES PATENTS

| | | |
|---|---|---|
| 1,270,163 | Jesurun et al. | June 18, 1918 |
| 1,696,178 | Ahlm | Dec. 25, 1928 |
| 1,740,977 | Freers | Dec. 24, 1929 |
| 1,987,733 | DeFonbrune | Jan. 15, 1935 |
| 2,322,455 | Klempferer | June 22, 1943 |
| 2,533,371 | Heine | Dec. 12, 1950 |
| 2,545,258 | Cailloux | Mar. 13, 1951 |
| 2,800,055 | May | July 23, 1957 |
| 2,940,357 | Oswold | June 14, 1960 |